May 17, 1960     I. L. LOOKER     2,936,716
GEAR TYPE FLUID PUMP

Filed July 11, 1955     2 Sheets-Sheet 1

Inventor:
Ivan L. Looker
By Schroeder, Hofgren,
Brady & Wegner
Attorneys

May 17, 1960
I. L. LOOKER
2,936,716
GEAR TYPE FLUID PUMP
Filed July 11, 1955
2 Sheets-Sheet 2
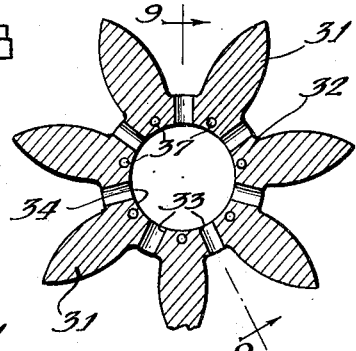
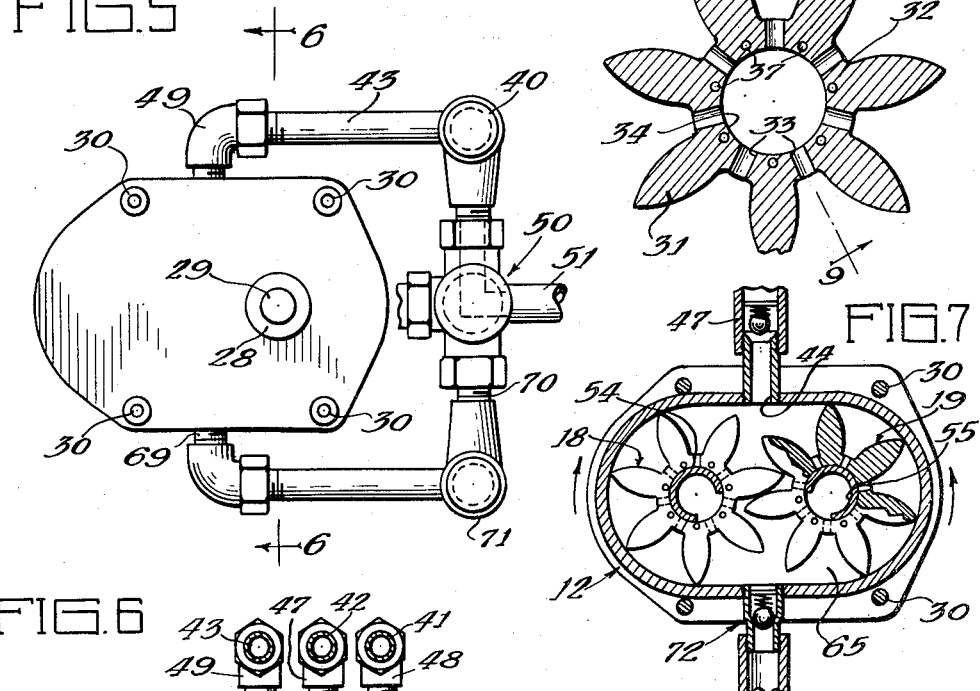
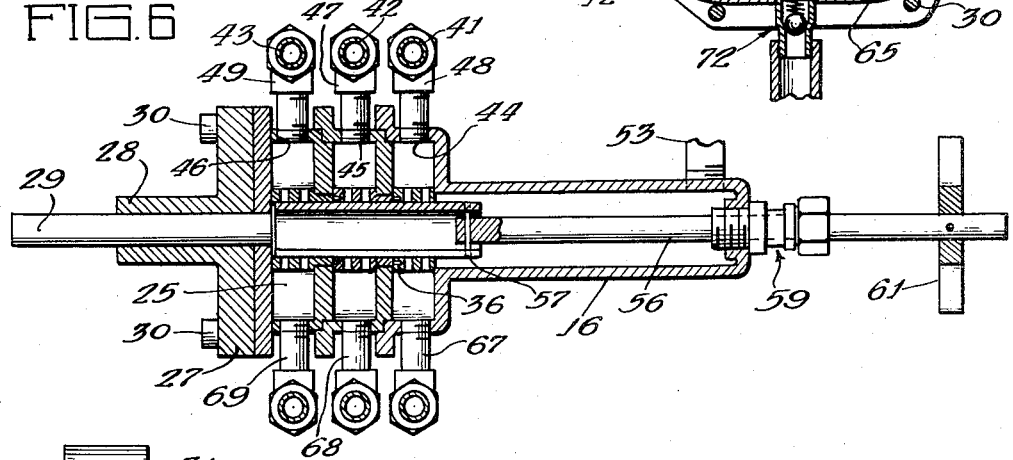
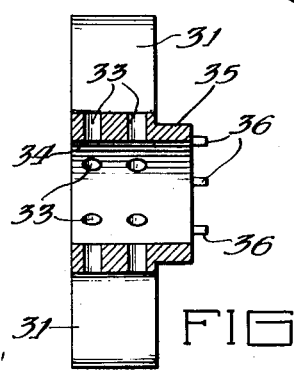
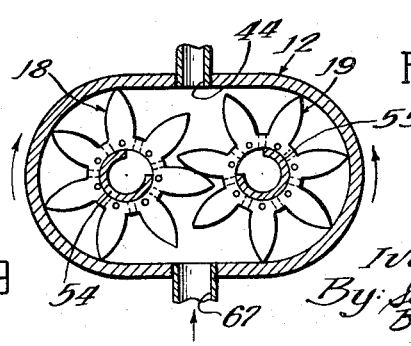
Inventor:
Ivan L. Looker
By Schroeder, Hofgren,
Brady & Wegner
Attorneys

United States Patent Office 2,936,716
Patented May 17, 1960

2,936,716

GEAR TYPE FLUID PUMP

Ivan L. Looker, Urbana, Ill.

Application July 11, 1955, Serial No. 521,047

6 Claims. (Cl. 103—120)

This invention relates to a gear type fluid pump and more particularly to a fluid pump having a plurality of pumping gear pairs.

The principal object of the present invention is to provide a gear type fluid pump in a casing such that a plurality of pairs of gears simultaneously driven may be selectively cut into pumping relation sequentially to increase volumetric output of the pump.

Another object is to provide a fluid pump of the gear type having more than one set of pumping gears and a manually operated mechanism for cutting the sets of gears in and out of pumping relation in pre-arranged sequence.

Another object is to provide a fluid pump having gears in pairs with one fluid passage communicating with the interior of the gears and including a valve member both rotatably and longitudinally movable in the gears.

A further object of the invention is to provide a fluid gear type pump capable of using a given input torque to greatest advantage in a given situation to provide fluid at high volumetric rates at a given pressure or comparatively less volume at much higher pressures. With a given input torque the product of output pressure and volume may be a constant.

Other advantages, features and objects of the present invention will be apparent from the following description of a preferred embodiment of the invention illustrated in the accompanying drawings in which:

Figure 5 is an elevational view of the pump looking toward the input drive shaft;

Figure 6 is a longitudinal sectional view through the pump taken substantially along line 6—6 in Figure 5 passing through the pump driving shaft;

Figure 7 is a fragmentary sectional view through the pump looking toward one pair of gears and taken substantially along line 7—7 in Figure 2;

Figure 8 is an enlarged fragmentary sectional view through one of the pumping gears;

Figure 9 is a sectional view through a pumping gear taken substantially along line 9—9 in Figure 8; and Figure 10 is a fragmentary sectional view similar to Figure 7 illustrating the control valve in a position different from that illustrated in Figure 7.

Figure 1:
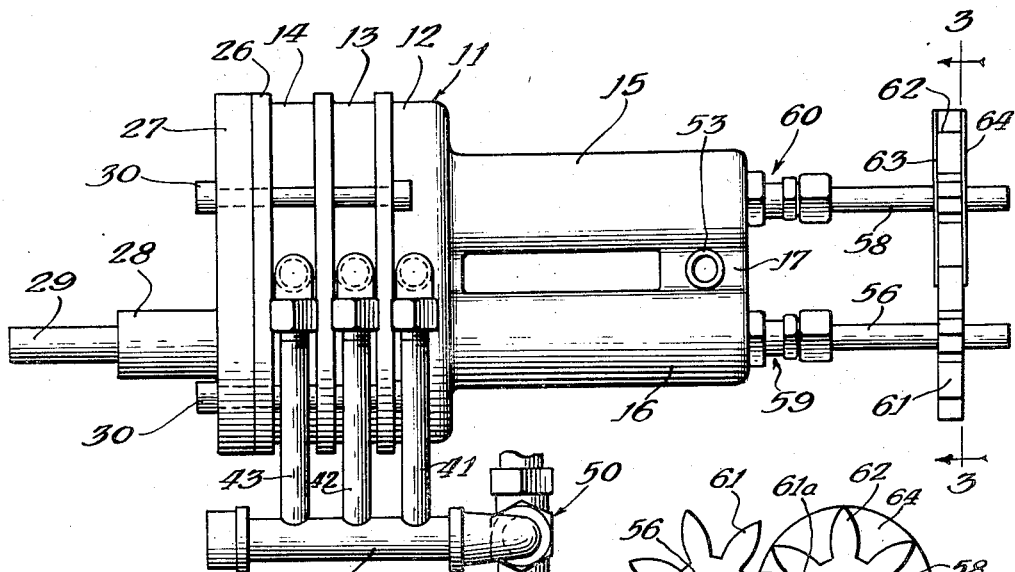
Figure 1 is a plan view of a pump embodying the present invention with a part of the connections broken away for clarity of illustration of the pump.

The particular fluid pump illustrated in the drawings has three separate pump sections with a pair of gears in each section for pumping a fluid. The embodiment illustrated is intended for pumping oil. In general, the structure is intended to be driven with a single input shaft which rotates all of the gears at the same time. The sets or pairs of gears may be sequentially rendered operative to pump oil into an exhaust manifold by a unique valve arrangement which also serves as one of the passages conducting oil to or from the gears. When one set of gears is not pumping, the oil merely by-passes through radial passages between the gear teeth connecting the hollow hub of the gear with the interdental spaces. Pumping will not occur until the radial passages are sealed or blocked so that the oil cannot by-pass from the interdental spaces to the hollow hub.

Figures 2, 3:
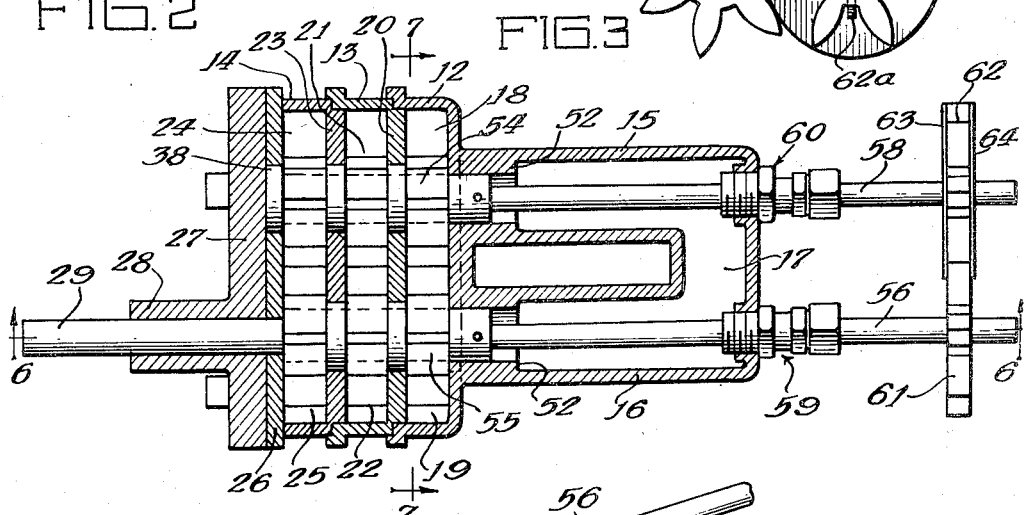
Figure 2 is a horizontal sectional view taken through substantially the center of the pump illustrated in Figure 1.
Figure 3 is a fragmentary sectional view along line 3—3 in Figure 1 diagrammatically illustrating one means for coupling the valve control rods together.

Referring particularly to Figures 1 and 2 of the drawings, the pump is provided with a casing generally indicated 11 having a plurality of sections 12, 13 and 14. The section 12 has attached thereto an elongated pair of hollow chambers 15 and 16 which are connected together at the end portion 17 remote from the section 12 for housing the valve members. A pair of gears 18 and 19 are in mesh with each other and repose in a casing section 12 which is closed on its left-hand side by the bottom wall 20 of the adjacent section 13.

Similarly, the section 13 has a pair of gears 21 and 22 in mesh with each other and arranged in the section in pump sealing relation with the walls thereof. Section 13 is closed on the lefthand side by the bottom wall 23 of the section 14. The third section 14 also has a pair of gears therein, namely 24 and 25, and this section is closed on its lefthand side by a plate 26 and a superposed cover plate 27 having a boss 28 providing the bearing for the input driving shaft 29. The sections are held together by a plurality of bolts 30, here shown as four in number located as illustrated in Figure 5.

The gears making up the pairs of pumping units are generally of the same design with a slight modification of the gears located in section 14 of the pump. The gears are shown particularly in Figures 8 and 9 wherein it will be noted that each gear has a plurality of teeth 31, a hollow hub 32 with radial passages 33 extending from the bore 34 within the hollow hub 32 to the interdental space of the gear. These radial passages are intended for passage of the oil or other fluid from the hub of the gear to the interdental space or in the opposite direction.

As particularly illustrated in Figure 9, each gear is provided with a cylindrical boss 35 on one side which forms a bearing support for the gear. The gears in pump sections 12 and 13 are each formed as illustrated in Figure 9 so that the bearing hub 35 finds support in the walls of the gear housing parts. For example, the gears in section 13 have a bearing support in the wall 20 between sections 12 and 13. The other gears are similarly supported.

As mentioned above, the input shaft 29 is intended for driving all of the gears at the same time. It will be noted in Figure 9 that the bearing hub 35 of the gear also supports a plurality of pins 36 which fit into drilled openings 37 (Figure 8) in the aligned gear of the adjacent section of the pump. In this manner, all of the gears are secured together so that the input shaft 29, which is welded or otherwise secured to the gear 25, can drive all of the gears at the same time. The attachment of the input shaft 29 to gear 25 is the only modification of gear 25 over the form illustrated in Figures 8 and 9. The gear 24 which meshes with gear 25 is given an additional bearing supporting boss 38 on its lefthand side (Figure 2) which finds a bearing support in the plate 26. Thus, each of the gears of the pump is provided with a bearing support on either side of the gear.

The pump is intended to deliver oil under pressure from one or more of the pumping sections into a common manifold. In Figures 1 and 5, the external connections to the pumping sections are illustrated. Thus, an exhaust manifold 40 has individual connections 41

42 and 43 respectively with the pumping sections 12, 13 and 14. The connection between the outlet port from each section to the manifold includes a ball check valve preventing the flow of fluid from the manifold into the pumping sections. The ports 44, 45 and 46 respectively are formed in the wall of the casing sections and a one-way ball check valve structure such as 47, diagrammatically illustrated in Figure 7, is included between the manifold and the ports. Usually two such ball check valves are used, one in the outlet from each of sections 13 and 14 of the pump. Such a check valve may also be placed in the outlet from section 12, however, is not needed. Ordinarily, the manifold 40 will be used to receive the fluid under pressure from the pairs of gears and it may be conducted through a two-way valve 50 and outlet 51 to a point of use, whether it be for driving a fluid motor of the gear type or for driving a piston and cylinder device or merely for building up pressure in a tank. The present invention is not concerned with the particular use to which the fluid outlet of the pump is put, as it forms no part of the invention.

Figure 4:
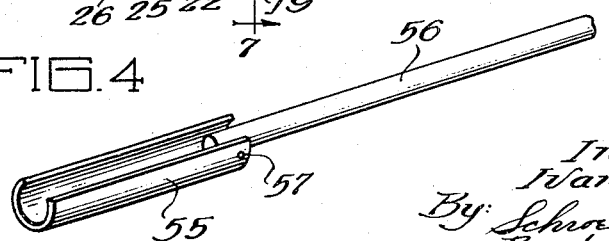
Figure 4 is a perspective view of a valve member and control rod removed from the pump.

The intake of fluid to the pairs of gears is through the hollow hubs of the gears and the radial passages to the interdental spaces. An oil inlet 53 communicating with the interconnecting part 17 between the elongated chambers 15 and 16 may supply oil to the gears through hollow sleeve valves 54 and 55 axially aligned with the gear hubs. The form of each of these valves is illustrated in Figure 4 wherein it will be noted that the valve is an elongated cylinder having approximately 90° of its surface removed so as in effect to form a slotted cylindrical member. The sleeve valves are attached to a control rod 56 and 58 by means of pins 57 which locate the rods on the centerline of the sleeves. The control rods are of sufficient length to pass out of the elongated chambers through a packing 59 or 60 respectively.

Particularly referring to Figure 2, it will be noted that the control rods 56 and 58 for the respective valve are externally connected together by a structure diagrammatically illustrated as a pair of intermeshing gears 61 and 62, one of which is equipped with shroud plates 63 and 64 so as to enclose the teeth of the gear 61. In this manner, the control rods 56 and 58 may be longitudinally moved through the packings into and out of the chambers or the two control rods may be simultaneously rotated relative to each other within the limits permitted by the set screws 61a and 62a threaded into gear 62. This external control is intended to diagrammatically illustrate one means in which the positioning and location of the split sleeve valve members may be made.

As mentioned above, oil may be conducted to the interior of the hollow chambers through an inlet 53 whereupon the oil may pass into the center of each sleeve valve and pass through the slotted portion of the sleeve to the radial passages within the gear teeth. The chambers for receiving the sleeve valves are of sufficient length to permit the sleeve to be fully retracted from within the hubs of the gears, a bearing 52 being provided for guiding the sleeve movement. When this is done, none of the gears will pump fluid since the fluid on the discharge side may simply by-pass back through the hub of the gear through the radial passages.

When it is desired to have the first section 12 pump fluid, the sleeve valves are moved to the left (Figures 1 and 2) to a position occupying the hollow hub of this pair of gears. This situation is illustrated in Figure 7. Oil can enter the entire casing of the pump. As far as the gears in section 12 of the pump are concerned, the oil must pass through the slotted portion of the sleeves 55, through the radial passages between the gear teeth and into the interdental space 65 which is open to the interior of the valves through the slotted portion of the valve and the radial passage. Thus oil fills this space and may be carried around the exterior of each of the gears by the rotation in the direction of the arrows on either side of the figure toward the exit port 44. It will be noted that the radial passages in the gears pass opposite the surface of the sleeve valve and are thus sealed against the return of the fluid in the interdental space to the interior of the valve. The first pumping section 12 of the pump is thus rendered capable of discharging oil under pressure into the manifold 40. The other sections 13 and 14 do not pump fluid into the manifold for the simple reason that the oil merely by-passes back and forth through the radial passages in the gear teeth.

Each section of the pump may be rendered operative to discharge fluid under pressure by simply moving the control valves into the hubs of the gears. Thus, sections 12 and 13 may both be placed in pumping operation or all three sections may be made to pump into the manifold at the same time. Appropriate indicia may be provided on the controls for indicating to an operator when he has properly positioned the valves for a desired number of sections to be placed in pumping operation. The particular valve structure is of advantage since the sleeve valves may be completely retracted from the hubs of the gears, thus idling all sections of the pump.

Another feature of the present pump structure is that the flow of fluid may be reversed without changing the direction of the rotation of the gears. This is illustrated diagrammatically in Figure 10 in which the sleeve valves 55 have been rotated by means of the connection between the control rods 56 and 58 so that the slotted portion occupies a quadrant 90° removed from the position illustrated in Figure 7. In this position, the slotted portion of the sleeve communicates with the radial passages through the gears on the opposite side of the casing from that illustrated in Figure 7. The hollow part of the sleeve thus becomes the outlet for oil under pressure and the inlet is provided by individual pipes 67, 68 and 69 secured in ports in the casings on the opposite side from the ports 44, 45 and 46. The two-way valve 50 must be changed either manually or automatically to connect the outlet 51 with line 70 into a manifold 71 having individual connections with the pipes 67, 68 and 69 into the lower part of the casing. In the Figure 10 construction, fluid would enter the lower ports of the casing, be carried around by the gear teeth in the direction of rotation illustrated by the arrows and then be forced through the radial passages into the interior of the sleeve valves where it would find its way to the port 53 in the elongated chambers and be discharged to a point of use.

In the operation of the pump illustrated in Figure 10 and described above, one, two or three sections of the pump may again be used since one-way valves such as that shown diagrammatically at 72 in Figure 7 are placed in the connections between the casing and the manifold 71. Ordinarily, it is not necessary to have one-way valves between the manifolds and the pumping section 12 since if any of the pumping gear pairs are to be used, the first such pair is that in the pumping section 12. Fluid discharged from this section must be prevented from re-entering into sections 13 or 14 through the connections with the manifold, however, there is no such need with regard to section 12. Each of the sections of the pump are sealed from the other sections except for the communication along the axes of the gears.

One particular advantage of the present pump is in obtaining an output of fluid in which the product of the volume and the pressure may remain a constant with a given input torque. In certain instances, the load on the pump may be such that a high pressure is needed and with a given input torque, this can best be accomplished by running only one section of the pump, i.e. section 12. In other instances, greater volume of fluid may be desired from the pump in which case, the maximum volume can be obtained by the discharge from all three sections. With a given input torque, the pressure may be reduced over that obtainable with one or two sections in accordance with the formula given above.

The foregoing detailed description has been given for clearness of understanding only, and no unnecessary limitations should be understood therefrom, for some modifications will be obvious to those skilled in the art.

I claim:

1. A multiple section fluid pump, comprising: a casing having a plurality of sections; a pair of meshing hollow hubbed fluid pumping gears in each section; an input shaft drivingly connected to the gears for driving all of the gears at the same time; a plurality of fluid discharge means, one connected with each section; a fluid inlet in said casing; and means for selectively changing the number of said pairs of gears that are in pumping relation including radial passages in the gears extending from the hollow hub thereof to the interdental spaces and a pair of hollow fluid conducting sleeve valves connected with said fluid inlet and respectively movable longitudinally into and out of the hollow hubs, each of said sleeve valves when within one or more of said hollow hubs having radially extending passages for supplying fluid from said inlet to said gear radial passages during an arcuate portion of their path and wall for sealing all of said radial passages preventing reverse fluid flow therethrough during the balance of their travel so as to pump said fluid, said gear radial passages being open upon withdrawal of the sleeve valve from a position within the hub of the gear so that no pumping may occur.

2. A fluid pump as specified in claim 1 wherein said discharge means are connected exteriorly of the casing into a common header and check valves are provided in each discharge means to prevent fluid flow from the header into the casing.

3. A multiple section fluid pump, comprising: a plurality of drivingly connected fluid pumping meshing gear pairs, at least one gear of each pair having a hollow hub and radial fluid flow passages connecting the hub and the interdental spaces of the gear; a casing enclosing the gears so as to permit communication between said pairs of gears only through said hollow hubs; a fluid inlet in said casing communicating with the hubs of said gears; and means for selectively rendering one or more of said pairs of gears incapable of pumping including a sleeve valve slidable longitudinally into and out of said hollow hubs in sealing engagement therewith, said sleeve valve being hollow for conducting fluid from said inlet to the gears when within said hollow hub and having fluid passage therein in radial communication with said gear radial passages during an arcuate portion of their path and wall sealing said gear radial passages during the balance of their path, said gear radial passages idling said gears when open with the sleeve valve withdrawn and comprising passages for pumped fluid when said gear radial passages are sealed by said valve, said sleeve casing having a fluid discharge opening for each pair of gears.

4. A multiple section fluid pump, comprising: a plurality of drivingly connected fluid pumping meshing gear pairs, at least one gear of each pair having a hollow hub and open radial passages connecting the hub and the interdental spaces of the gear; a casing enclosing the gears so as to permit communication between said pairs of gears only through said hollow hubs; a fluid inlet in said casing; and means for selectively rendering one or more of said pairs of gears capable of pumping including a sleeve valve slidable longitudinally into and out of said hollow hubs, said sleeve valve extending from said inlet to the gears and being hollow and open at its ends for conducting fluid from said inlet to the gears and having openings on one side thereof for radial communication with said radial passages in said gears during an arcuate portion of gear rotation and sealing said passages during the balance of gear rotation, said gears being capable of pumping only when said radial passages are so sealed by said sleeve valve, movement of the valve out of said gear hub opening said gear passages and idling the gears and said casing having fluid discharge openings respectively connected with the discharge side of each pair of gears.

5. A fluid pump, comprising: a casing having a plurality of internal sections; a pair of meshing gears rotatably mounted in each casing section with respective gears of each pair arranged for rotation about one of a pair of common axes; a plurality of fluid flow passages in the casing, two communicating with each casing section arranged on opposite sides of said gears; intake passages to the interdental spaces of the gears including radial passages through the gears and a pair of hollow sleeve members respectively slidable along said axes into said gears to block said radial passages for pumping action and out of said gears for opening said passages to idle said gears, said sleeve members having radial fluid passage means in communication with said gear radial passages about an arcuate portion of said sleeves and a wall blocking fluid flow from the interdental spaces through said radial passages about the remaining portion of the sleeves; an inlet means in said casing communicating with said hollow sleeve members; control means for rotating said sleeve members within the gears to change the position of said arcuate portion of the sleeves relative to the gears permitting pumping action by rotation of the gears in either direction, said fluid flow passages in the casing having check valves and being adapted for use, one with each direction of gear rotation; and an input shaft drivingly connected to the gears for driving said gears simultaneously for discharge of fluid from each pair of gears within which the sleeve members are positioned.

6. A pump, comprising: a casing; a plurality of rotatably mounted intermeshing pairs of gears in the casing, said pairs of gears being aligned side by side; a drive shaft secured to said gears for driving all the gears together with a constant input torque; a plurality of separate discharge passages in the casing, one adjacent the meshing portions of each pair of gears; an intake including a fluid inlet in the casing, passages extending radially outward from within said gears to the interdental spaces of said gears and a pair of hollow split sleeve members extending between and connecting the inlet and said gear passages, said sleeve members being movable longitudinally into and out of said respective aligned gears, said sleeve members having an arcuate wall to block flow of fluid from the discharge passage through said gear radial passages when the sleeve members are within the gears and said gear passages are opposite said wall, said split sleeve members permitting fluid flow only when said gear passages communicate with the interior of said sleeve through said split to selectively render the pairs of gears capable of pumping when the sleeve valve is positioned within the gears, removal of said sleeve valve from the gears opening said radial gear passages and idling said gears, said sleeve members having a length to repose in all of the pairs of gears simultaneously and movement of said sleeve members into said pairs of gears being adapted to sequentially change said pairs of gears from idling to pumping relation.

References Cited in the file of this patent

UNITED STATES PATENTS

| | | |
|---|---|---|
| 894,251 | Batdorf | July 28, 1908 |
| 1,076,299 | Marshall | Oct. 21, 1913 |
| 1,862,440 | Tacchi | June 7, 1932 |
| 2,146,123 | Logan | Feb. 7, 1939 |
| 2,261,469 | Harter | Nov. 4, 1941 |
| 2,371,227 | Dodge | Mar. 13, 1945 |
| 2,371,228 | Dodge | Mar. 13, 1945 |
| 2,607,295 | Drucker | Aug. 19, 1952 |